United States Patent
Seo

(10) Patent No.: US 8,966,387 B2
(45) Date of Patent: Feb. 24, 2015

(54) METHOD AND APPARATUS FOR MANAGING ICON IN PORTABLE TERMINAL

(75) Inventor: Bong-Joo Seo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 184 days.

(21) Appl. No.: 13/554,629

(22) Filed: Jul. 20, 2012

(65) Prior Publication Data

US 2013/0024796 A1 Jan. 24, 2013

(30) Foreign Application Priority Data

Jul. 21, 2011 (KR) ........................ 10-2011-0072591

(51) Int. Cl.
  *G06F 3/048* (2013.01)
  *G06F 3/033* (2013.01)
  *G06F 3/0488* (2013.01)
  *G06F 3/0481* (2013.01)

(52) U.S. Cl.
  CPC ........ *G06F 3/04883* (2013.01); *G06F 3/04886* (2013.01); *G06F 3/04817* (2013.01)
  USPC ......................................... 715/769; 715/863

(58) Field of Classification Search
  USPC ................................. 715/769, 863
  See application file for complete search history.

(56) References Cited

U.S. PATENT DOCUMENTS

| | | | |
|---|---|---|---|
| 5,583,542 A | * | 12/1996 | Capps et al. .................. 345/173 |
| 2002/0080180 A1 | * | 6/2002 | Mander et al. ................ 345/769 |
| 2009/0278806 A1 | | 11/2009 | Duarte et al. |
| 2009/0327975 A1 | * | 12/2009 | Stedman ....................... 715/863 |
| 2011/0087981 A1 | | 4/2011 | Jeong et al. |
| 2011/0252349 A1 | * | 10/2011 | Chaudhri ...................... 715/769 |
| 2012/0030623 A1 | * | 2/2012 | Hoellwarth ................... 715/811 |

FOREIGN PATENT DOCUMENTS

| | | |
|---|---|---|
| WO | WO 93/22738 | 11/1993 |
| WO | WO 2007/142256 | 12/2007 |

OTHER PUBLICATIONS

Joshua Tucker: "Unfolder—Better iDevice Folder Management", XP002718156, May 29, 2011.
David Pogue: "iPhone: The Missing Manual", Fourth Edition, Aug. 24, 2010.

* cited by examiner

*Primary Examiner* — Andrea Long
(74) *Attorney, Agent, or Firm* — The Farrell Law Firm, P.C.

(57) ABSTRACT

A method and an apparatus for managing icons in a portable terminal are provided. The method includes displaying a folder item including at least one icon; sensing a user touch action on the folder item; and moving a plurality of the icons included in the folder item to an area outside of the folder item according to the user touch action.

20 Claims, 11 Drawing Sheets

METHOD AND APPARATUS FOR MANAGING ICON IN PORTABLE TERMINAL

PRIORITY

This application claims priority under 35 U.S.C. §119(a) to a Korean patent application filed in the Korean Intellectual Property Office on Jul. 21, 2011 and assigned Serial No. 10-2011-0072591, the entire content of which is incorporated herein by reference.

BACKGROUND OF THE INVENTION

1. Field of the Invention

The present invention relates generally to a portable terminal, in particular a method and an apparatus for managing icons in a portable terminal.

2. Description of the Related Art

Many portable terminals provide various convenient and auxiliary functions, which may secure more customers for manufacturers and service providers of portable terminals, as the usage of portable terminals increases. Recently, manufacturers and service providers have been competitively providing various applications in portable terminals for allowing a user to enjoy various pastimes and providing functions that add convenience to a user's life. Therefore, portable terminals tend to have at least several applications.

When the portable terminals have a large number of applications, it may become difficult for users to find a particular application. Hence, applications may be organized using folders that may each provide access several applications. For example, the users may create a game folder and a life folder, and add icons for designating a plurality of game applications to the game folder and add icons for designating applications relevant to a user's daily life (e.g., a scheduler, a morning alarm, a traffic guide application, etc.) to the life folder. Arranging applications into folders in this manner may enhance the accessibility to the corresponding application within each respective folder.

Currently, a folder may created or deleted according to the control of the users, and portable terminals may also provide a function for adding applications to a folder and/or to move applications from a folder to a location external to the folder. For example, in a touch screen terminal, such functions may be provided by detecting touch actions of user. For example, the user may touch an icon to designate a first application to drag in a game folder in order to add the first application to the game folder. A user may touch the first application included in the game folder of the portable terminal and drag the application to an area outside of the folder in order to remove the first application from the game folder and to move the first application to a location outside of the folder. When the application must be moved in the above-described manner, such as when a user intends to move all the application in the folder to another location outside of the folder, there is disadvantage in that each application must to be touched and moved one at a time in order move all of the applications within the folder.

Hence, there is a need for a new method for managing application icons included in a folder.

SUMMARY OF THE INVENTION

An aspect of the present invention is to address the above-mentioned problems and to provide a method and an apparatus for managing icons in a portable terminal.

Another aspect of the present invention is to provide a method and an apparatus for moving application icons included in a folder in a portable terminal.

Another aspect of the present invention is to provide a method and an apparatus for moving all application icons included in a folder to a location outside of the folder, one at a time.

According to an aspect of the present invention, a method for managing icons in a portable terminal is provided. The method includes displaying a folder item including at least one icon; sensing a user touch action on the folder item; and moving a plurality of the icons included in the folder item to an area outside of the folder item according to the user touch action.

According to another aspect of the present invention, an apparatus for managing icons in a portable terminal is provided. The apparatus includes a display unit for displaying a folder item including at least one icon; a touch sensor for detecting a user touch action on the folder item; and a control unit for moving a plurality of the icons included in the folder item to an area outside of the folder item according to the user touch action.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described herein below with reference to the accompanying drawings. In the following description, well-known functions or constructions may not described in detail in order to avoid obscuring the invention in unnecessary detail. Also, the terms used herein are defined according to the functions of the present invention. Accordingly, the terms used herein must be understood based on the descriptions made herein.

Embodiments of the present invention include a method and an apparatus for moving application icons included in a folder in a portable terminal. Herein, a portable terminal may refer to an electric device having a touch sensor such as a mobile phone, a tablet Personal Computer (PC), a notebook PC, etc. However, embodiments of the present invention are not limited to the above-mentioned examples of portable terminals, but may include all electronic devices having the touch sensors, and the described methods and apparatuses may applied to other such devices in a similar manner.

Figure 1:
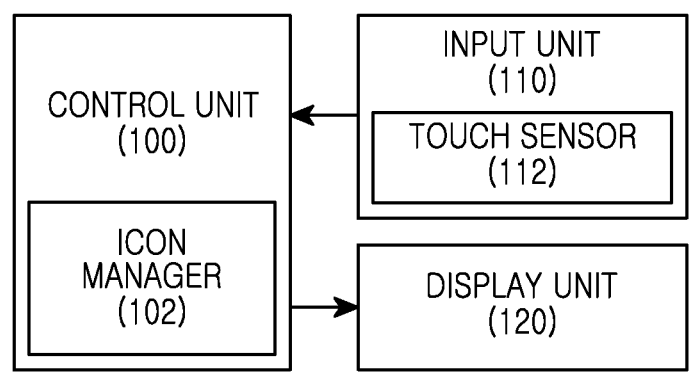
FIG. 1 is a block diagram illustrating a portable terminal according to an embodiment of the present invention.

FIG. 1 is a block diagram illustrating a portable terminal according to an embodiment of the present invention.

Referring to FIG. 1, a portable terminal according to an embodiment of the present invention includes a control unit 100, an input unit 110 and a display unit 120. The control unit 100 includes an icon manager 102, and the input unit 110 includes a touch sensor 112.

The control unit 100 controls and processes overall operations of the portable terminal, and, in particular, the control unit 100 manages the movement of icons designating various applications included in the portable terminal through the icon manager 102. The icon manager 102 controls display of at least one folder including at least one icon through the display unit 120, and controls sensing a touch of a user through the input unit 110 and control and process functions for moving icons included in a specific folder to another location outside of the specific folder. The icon manager 102 senses a user's selection of the specific folder and repeated touch movements to the left and right, and moves the icons included in the specific folder to the location outside of the specific folder in order to delete the specific folder. For example, when the user selects the specific folder, the icon manager 102 opens the selected folder to display the icons included in the selected folder, and senses an action to touch an area located at the outside of the displayed icons left and right repeatedly to control the function for moving the icons included in the selected folder to the location outside of the selected folder. The icon manager 102 controls the function for moving the icons included in the folder to the location outside of the specific folder, if the user touches the specific folder and moves the specific folder left and right repeatedly by moving the touch left and right with the touch to the folder maintained. In that case, the location outside of the specific folder may be an upper area, an upper route, an upper folder or an upper category where the folder is included. For example, if the specific folder is displayed over a wallpaper area, the icon manager 102 moves icons included in the specific folder to the wallpaper area.

And also, the icon manager 102 changes the size, the shape, and/or the hue of the folder, and/or controls and performs a function for indicating a selected folder by creating a special animation effect, when the folder is selected by the user. The icon manager 102 checks whether a free area for accommodating all the icons exists in a location outside of the folder, when all of the icons included in the folder are moved to the outside area. When a free area exists, the icon manager 102 moves all of the icons to the location outside of the folder. However, if the area outside of the folder is insufficient for accommodating all of the icons in the folder, the icon manager 102 moves only some of icons to the corresponding free area and/or provide a notice to the user that the movement cannot be carried out due to the lack of sufficient free area for moving all of the icons in the folder.

The input unit 110 provides the control unit 100 with the data input by the user. The input unit 110 provides the control unit 100 with data corresponding to a key pressed by the user, such as a function key. In particular, the input unit 110 includes a touch sensor 112 to sense a touch of the user and provides the control unit 100 with coordinate data corresponding to a position touched by the user.

The display unit 120 displays various kinds of status information, numerals, characters and images generated during the operation of the portable terminal. In particular, the display unit 120 displays screens created during the movement of the icons, as shown in the following FIG. 3 and FIG. 5, for example.

Figure 2:
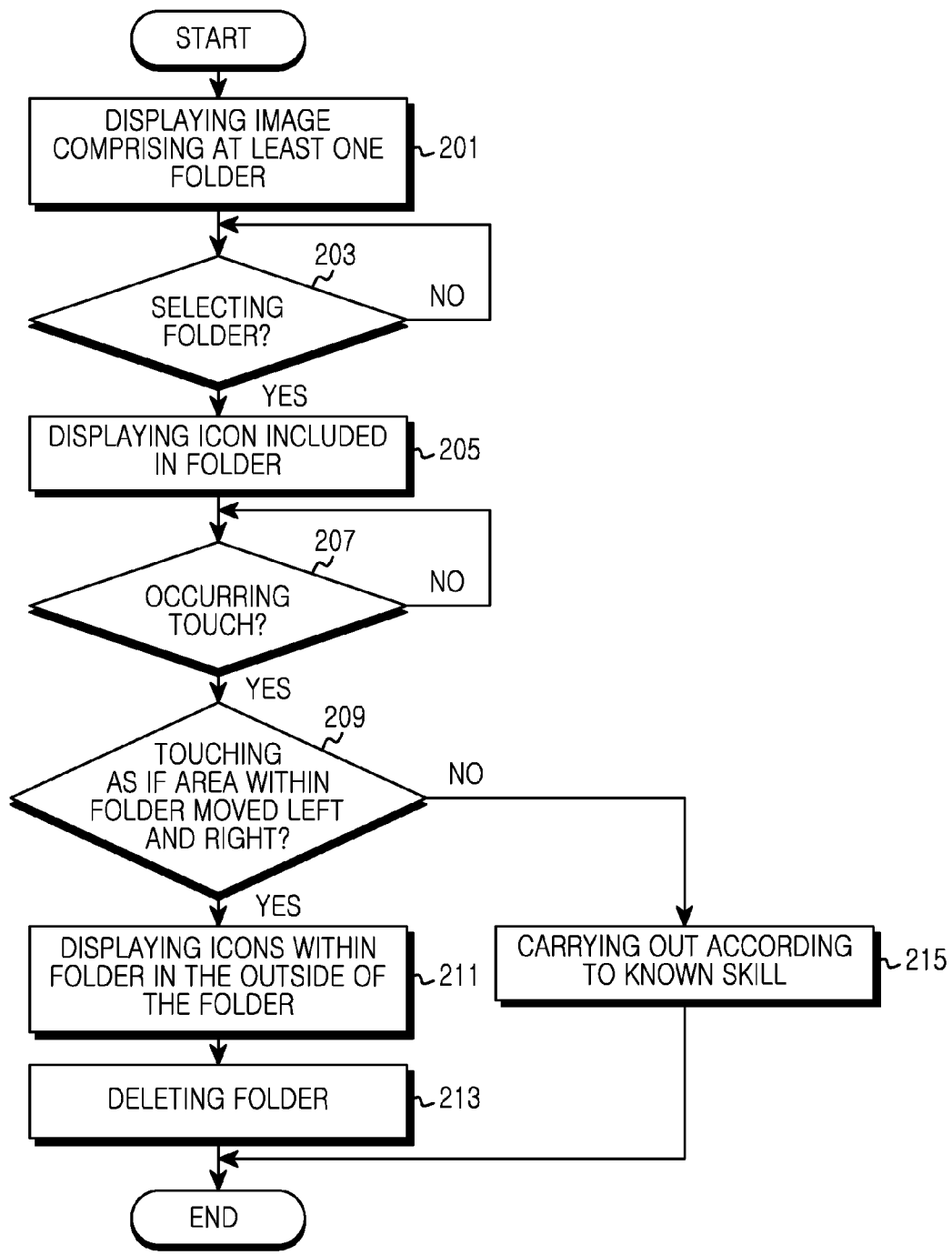
FIG. 2 is a flowchart illustrating a process for moving icons in a portable terminal according to an embodiment of the present invention.

FIG. 2 is a flowchart illustrating a process for moving icons in a portable terminal according to an embodiment of the present invention.

Referring to FIG. 2, in step 201, the portable terminal displays an image including at least one folder. The portable terminal checks whether a specific folder is selected by a touch of the user, in step 203. Herein, selection of a folder refers an action such as touching the corresponding folder and releasing the corresponding touch action.

Figure 3A:
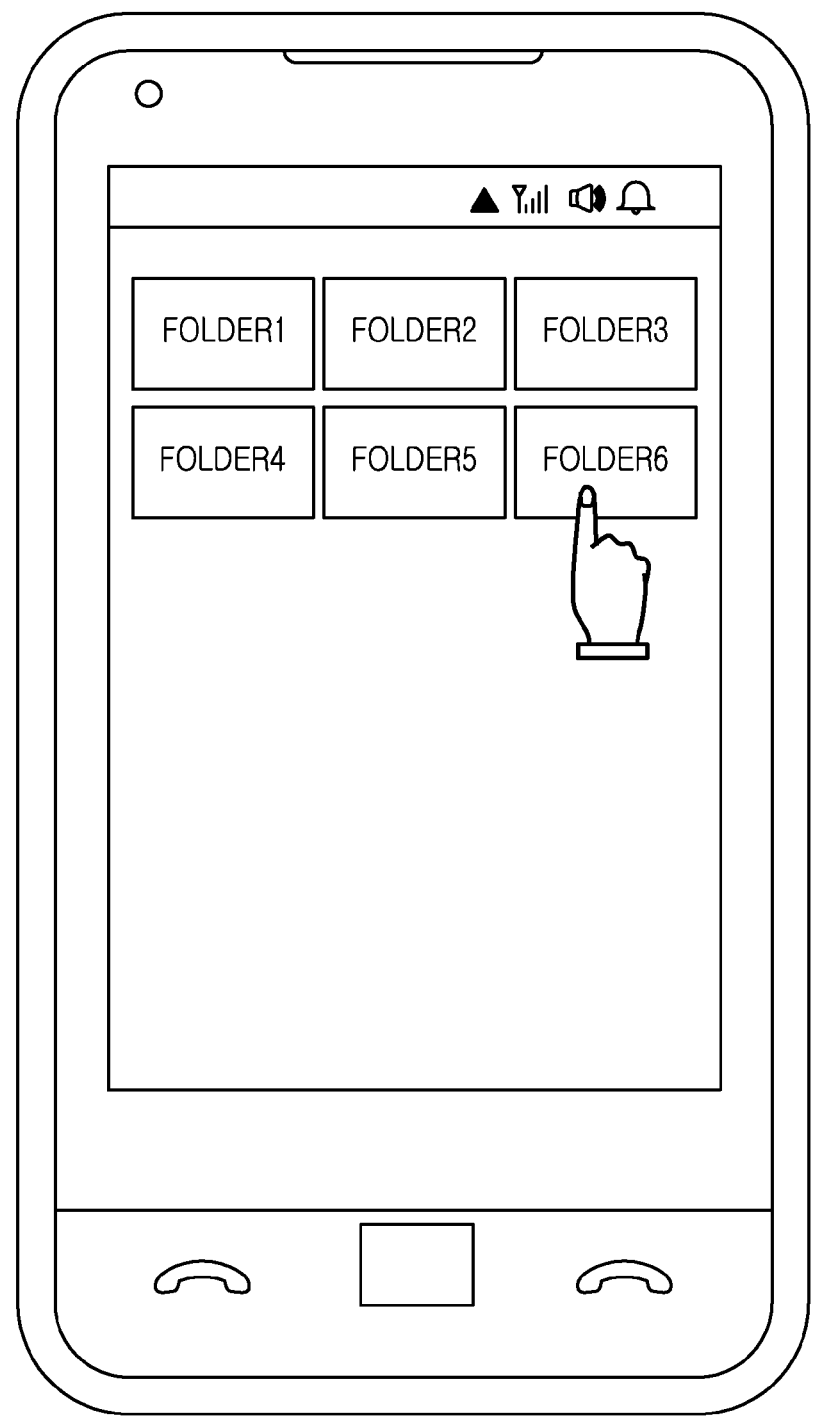
FIGS. 3A to 3D are diagrams illustrating examples of display screens for moving icons in a portable terminal according to an embodiment of the present invention.
Figure 3B:
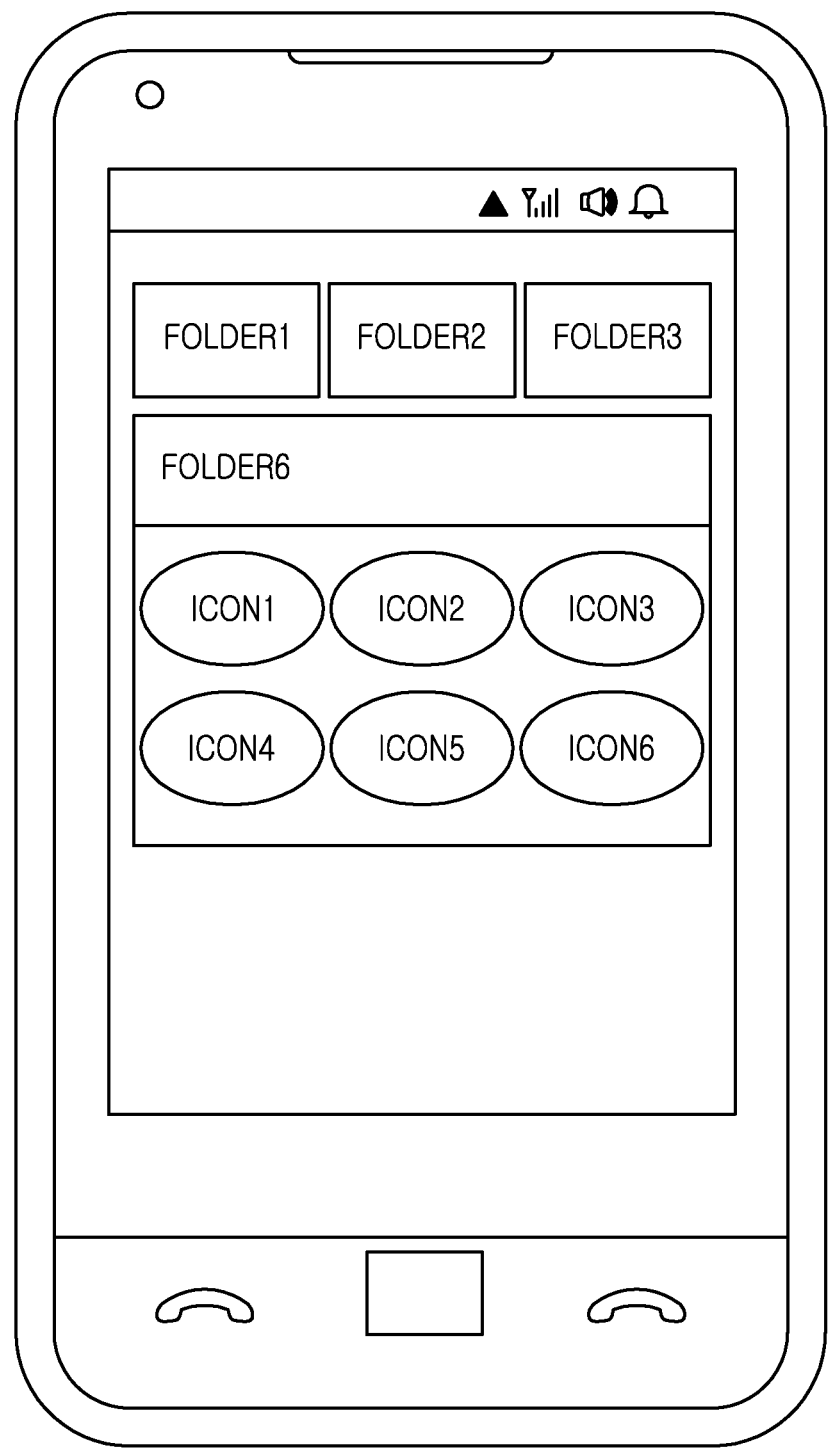

If a specific folder is selected by a touch of the user, the icons included in the folder are verified and displayed in the portable terminal, in step 205. For example, if the user selects folder 6, as shown in FIG. 3A, an image designating that icons 1 to 6 included within folder 6 is displayed, as shown in FIG. 3B.

The portable terminal checks whether a user touch occurs within the selected folder, in step 207. If the user touch occurs within the selected folder, the shape and hue of the folder may be changed, or the folder may be designated by generating an animation effect corresponding to the selected folder.

If a user touch is detected in step 207, the portable terminal checks whether the touch corresponds to an action repeatedly moving to the left and right. An occurrence of icon movement event may be judged by detecting the repeated execution of an action to move left and right beyond a critical distance while the same touch is maintained, after the user touches an area in which an icon is not displayed in the folder in the portable terminal. If the user carries out such an action, the portable terminal determines that an icon movement event is occurring. Otherwise, the portable terminal determines that no icon movement event is occurring. Alternatively, the portable terminal may also determine that an icon movement event occurs, even if the user touches an area in which the icon is displayed during the repetition of the action moving left and right after the user touches an area in which an icon is not displayed in the folder in the portable terminal.

Figure 3C:
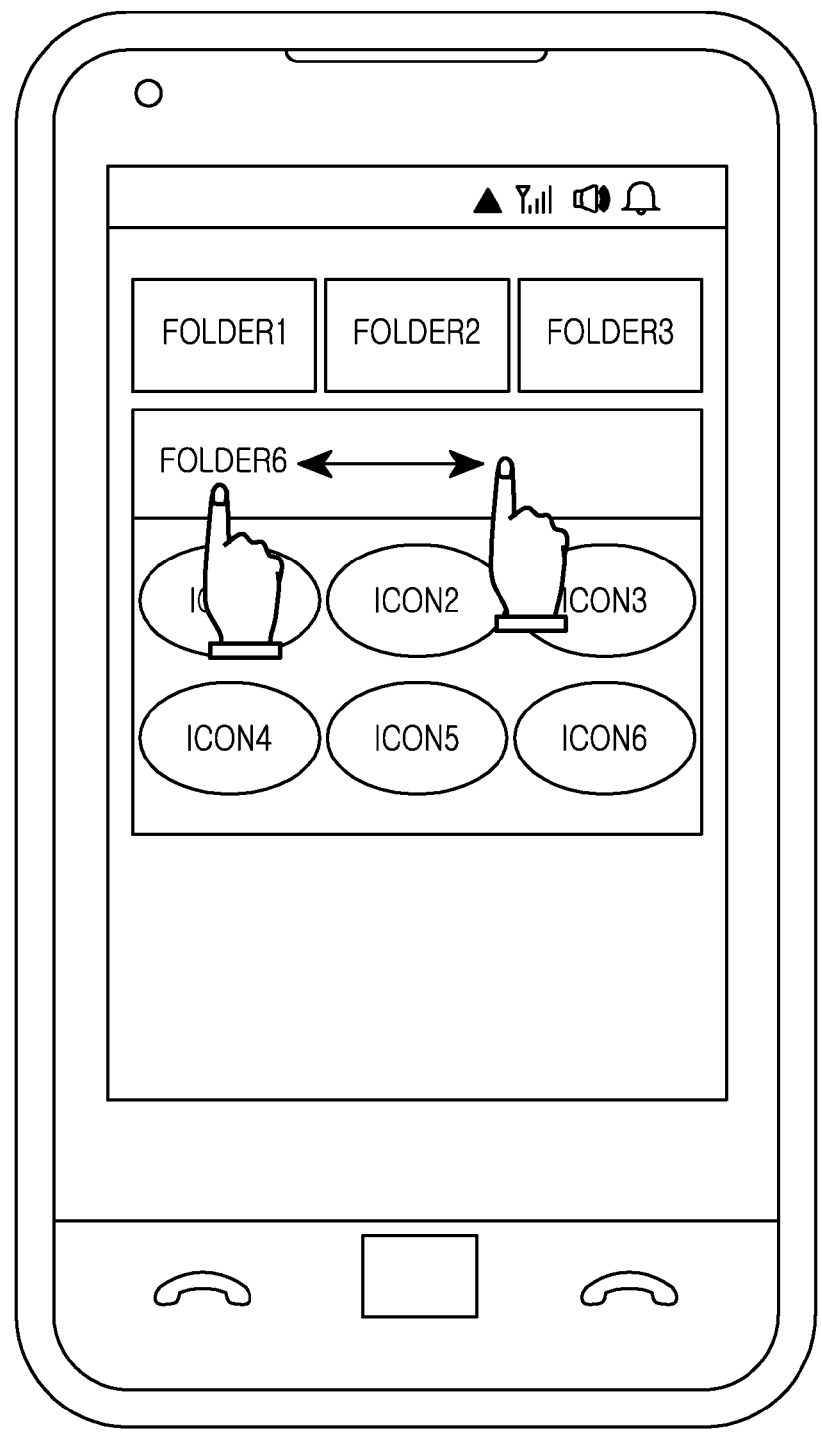
Figure 3D:
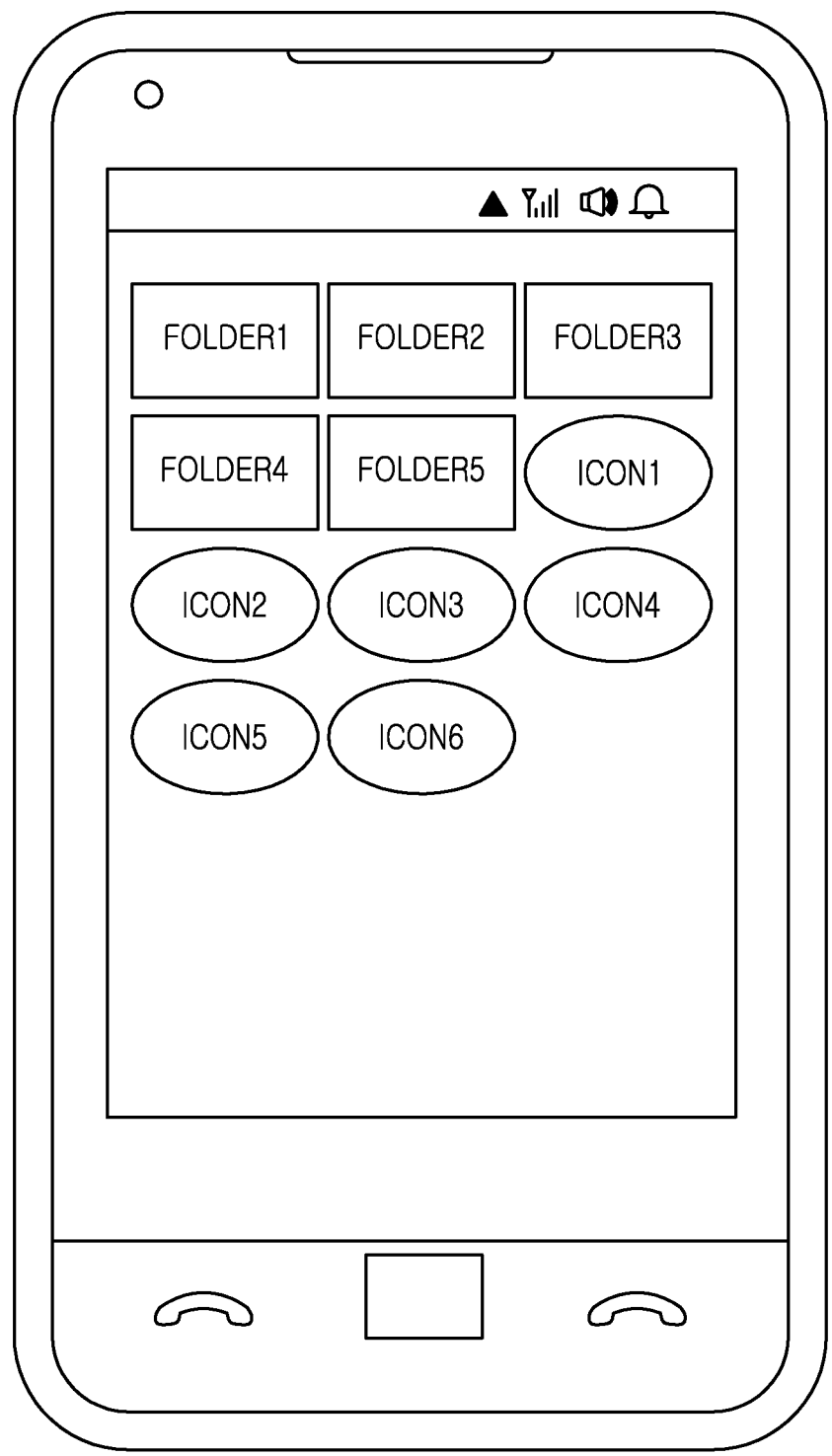

If the user's touch repeatedly moving to the left and right as described above is performed, the portable terminal determines that an icon movement event occurs, in step 209, and in step 211, icons displayed within the folder in the step of 205 are moved to a location outside of the folder, and then the folder may be subsequently deleted in step 213. For example, if the user touches an area in which an icon is not displayed while moving repeatedly to the left and right within the selected folder 6, as shown in FIG. 3C, icons 1 to 6 included in folder 6 are removed from folder 6 and are displayed in a parent folder in which folder 6 is included, as shown in FIG. 3D. In that case, folder 6 may be deleted, while icons 1 to 6 are displayed in a free area of the parent folder. Alternatively, similar operations may be performed without deleting folder 6, according to the design structure of the portable terminal or according to user settings.

However, if the touch of the user does not correspond to an action to touch an area within the displayed folder repeatedly moving to the left and right, the portable terminal determines that no icon movement event is occurring and another function of a corresponding touch action may be carried out, in step 215, and the algorithm according to the method of FIG. 2 may be terminated. For example, if an icon displayed within the selected folder is touched, an application corresponding to the icon may be performed.

Figure 4:
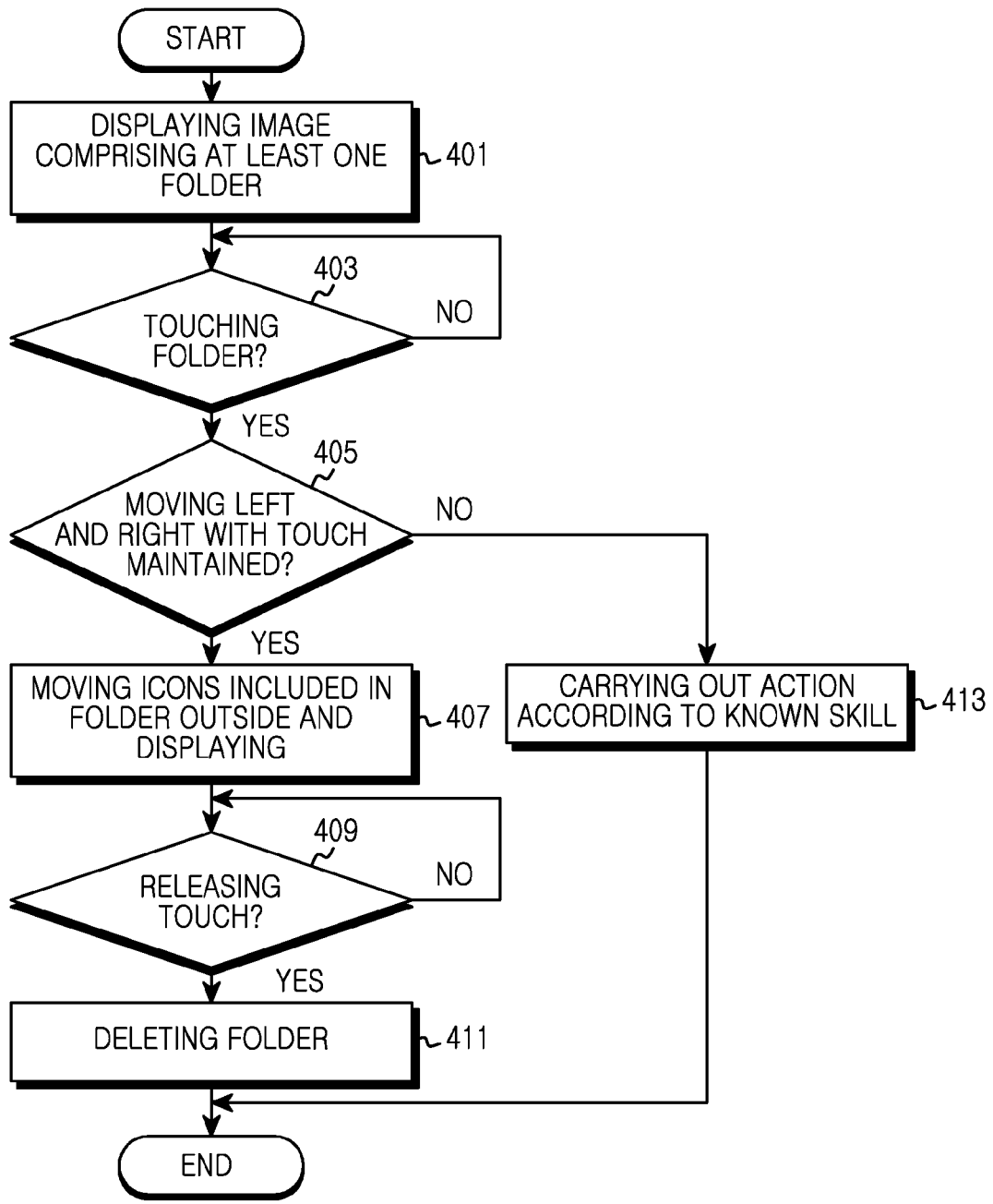
FIG. 4 is a flowchart illustrating a process for moving icons in a portable terminal according to an embodiment of the present invention.

FIG. 4 is a flowchart illustrating a process for moving icons in a portable terminal according to an embodiment of the present invention.

Referring to FIG. 4, an image including at least one folder is displayed in a portable terminal, in step 401. In step 403, the portable terminal checks whether a specific folder is touched by a user. If a specific folder is touched by the user, the shape and hue of the folder may be changes, or the touched folder may be designated by generating an animation effect corresponding to the touched folder.

If the folder is touched, in step 405, the portable terminal checks whether the user repeatedly moves the touch to the left and right while the same touch is maintained. For example, the portable terminal may check whether the user repeatedly moves the touch to the left and right beyond a critical distance while the same touch is maintained, such as shown in FIG. 4B with respect to folder 6, after the user touches folder 6, while six folders including folder 6 are displayed in the screen, as shown in FIG. 4A. If the user moves the touch to the left, as if performing a drag to the left, and then moves to the right as if performing a drag to the right, while touch with folder 6 is maintained, the movement of the folder along the touch of the user may be designated as moving the location of folder 6 to a left direction and then moving the location to a right direction according to the coordinates touched by the user during the movement.

Figure 5A:
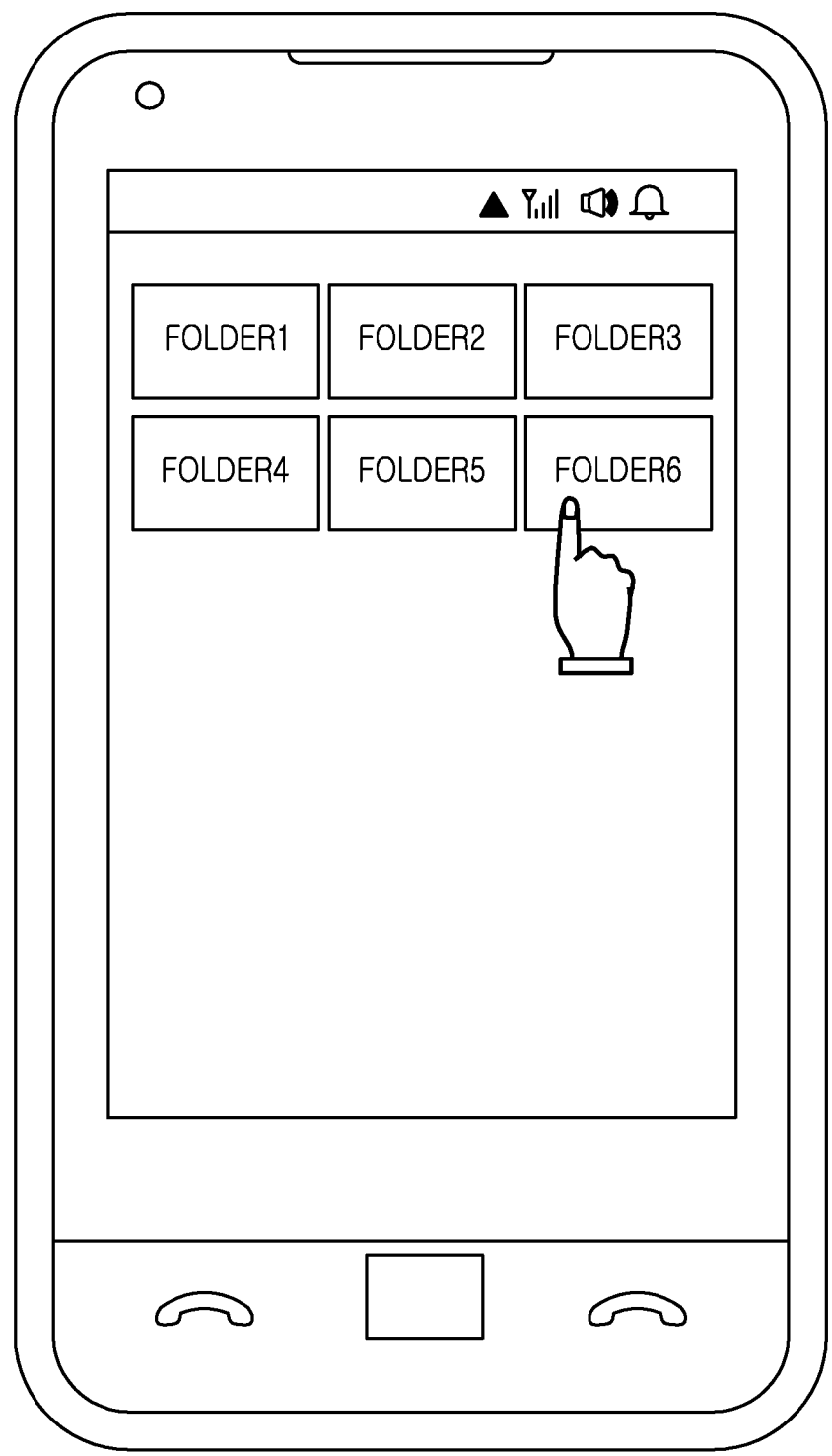
FIGS. 5A to 5D are diagrams illustrating examples of display screens for moving icons in a portable terminal according to an embodiment of the present invention.
Figure 5B:
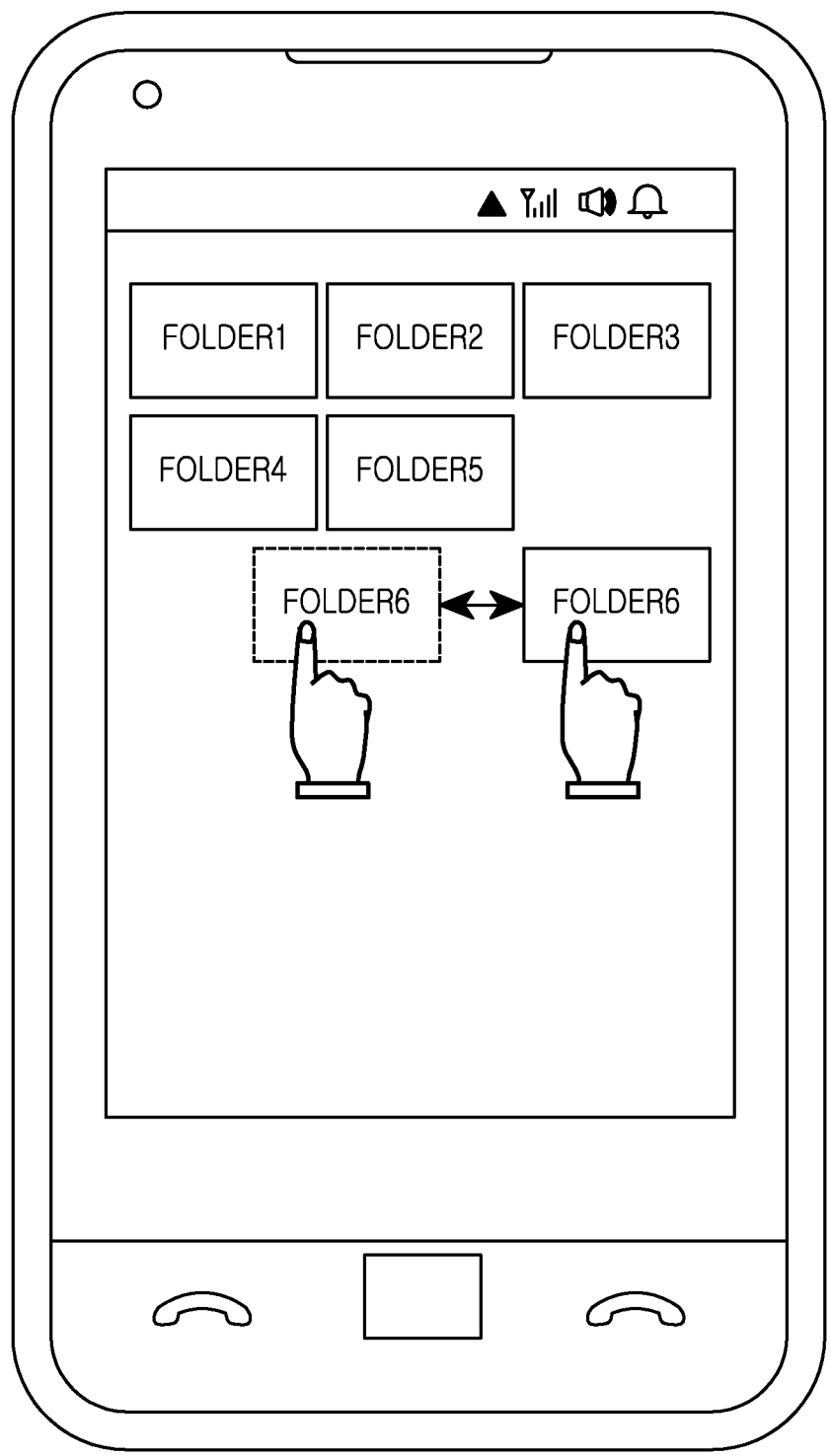
Figure 5C:
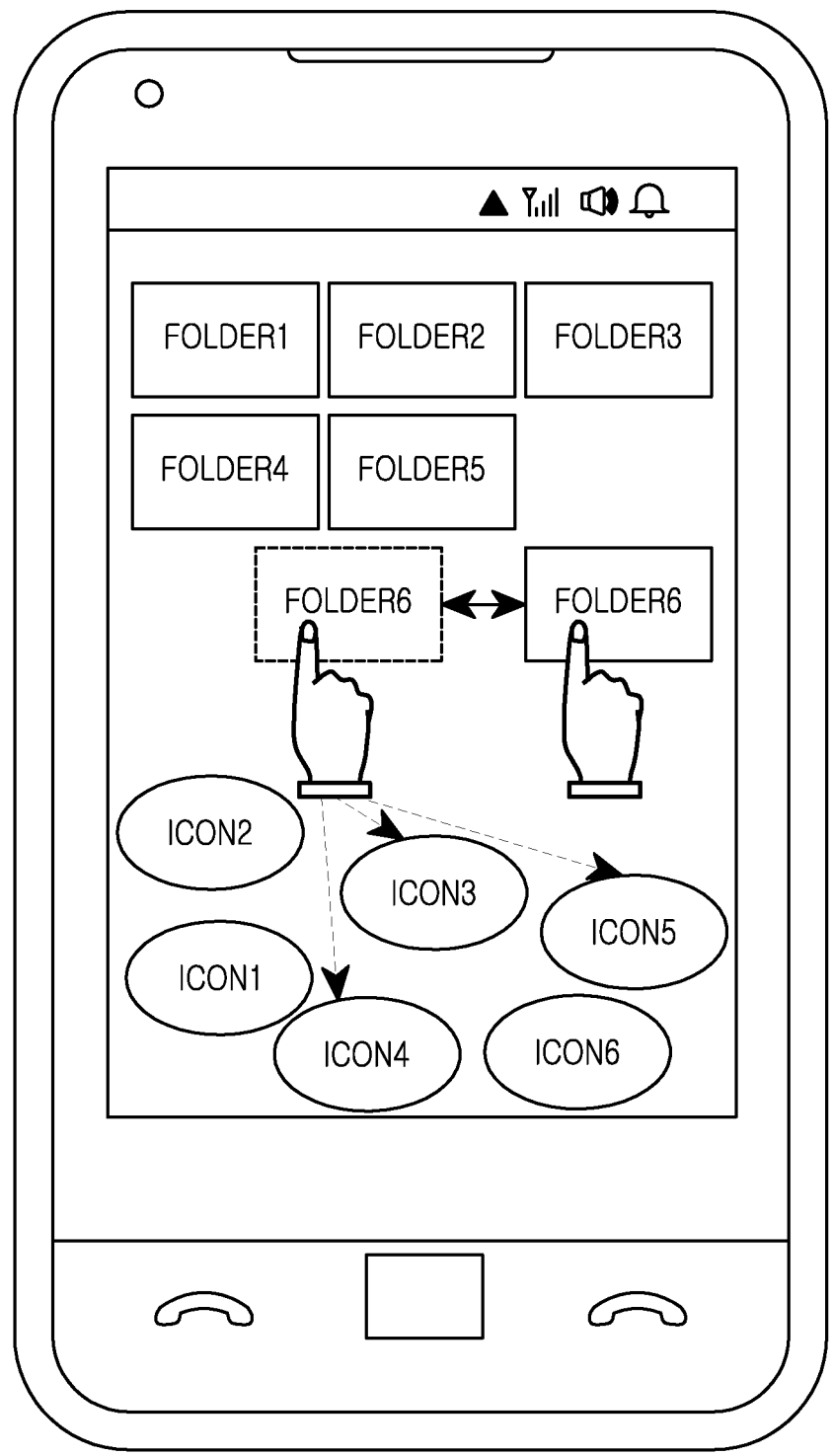

If the user repeatedly moves the touch to the folder left and right while the touch of the folder maintained, the portable terminal determines that an icon movement event occurs, and the icons included in the touched folder are moved to a location outside of the folder to be displayed, such as in step of 407 of FIG. 4. For example, if the user repeatedly moves the selected folder 6 beyond a critical distance to the left and right, such as shown in FIG. 5B, icons 1 to 6 included in folder 6 are moved outside of the folder 6 to be displayed in the portable terminal, such as shown in FIG. 5C, for example. In that case, an animation effect may be presented in the portable terminal, showing the icons 1 to 6 got moving out of folder 6. The animation effect may be displayed such that it appears as if icons 1 to 6 move out from folder 6 simultaneously, or such that it appears as if icons 1 to 6 move out from folder 6 one at a time. The animation effect may be selected according to the number of times the touch is moved to the left and right. For example, if the touch is moved left and right one time, icon 1 may be moved out of folder 6, and then if the touch is moved left and right a second time, icon 2 may be moved out of folder 6, etc. The exit of each icon may be represented through an animation effect.

Figure 5D:
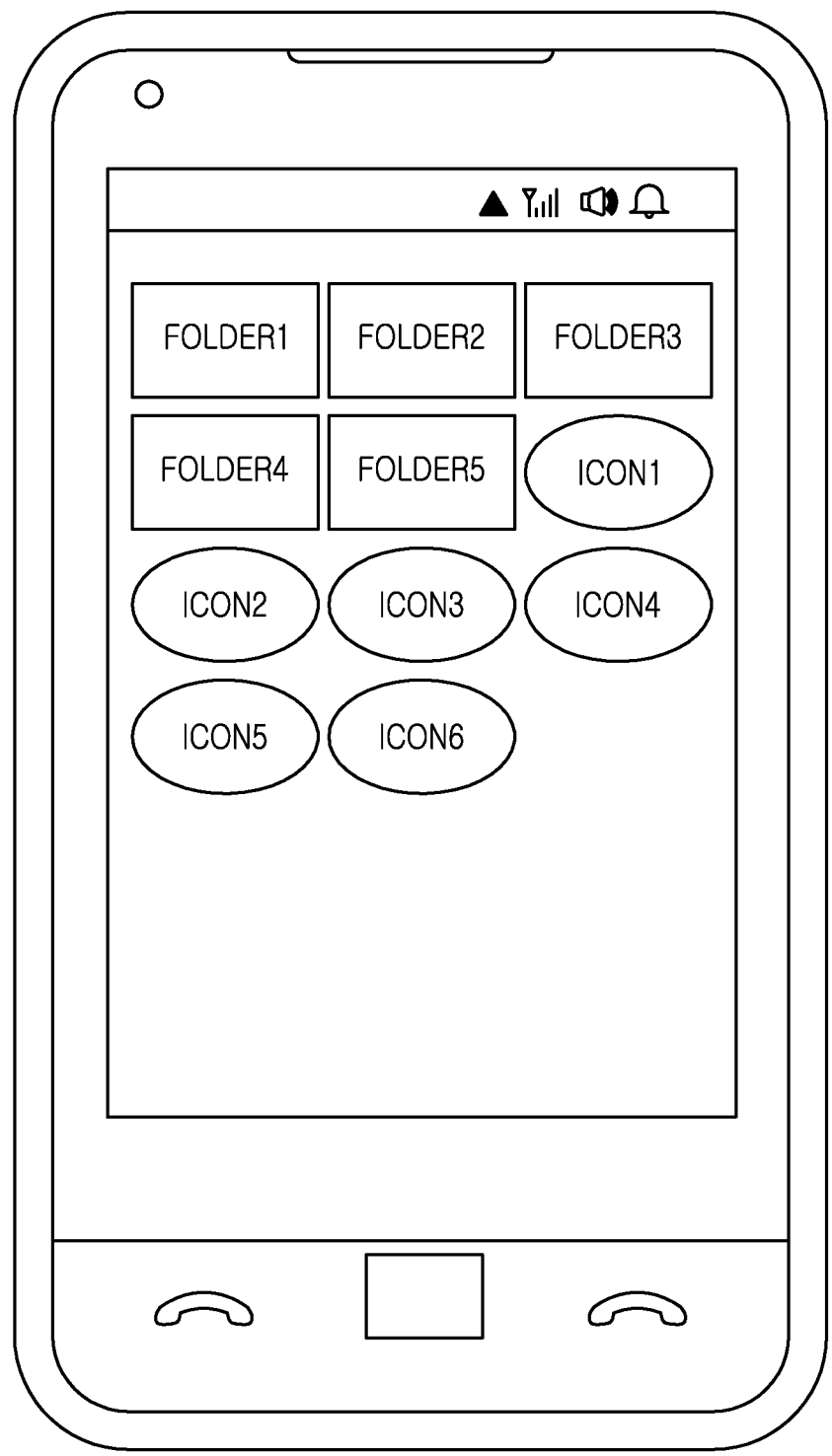

In step 409, the portable terminal determines whether the user touch is released. If the touch is released, the folder may be deleted in step 411, and the algorithm may be terminated. Fox example, if the touch of the user is released in the portable terminal, folder 6 may be deleted as shown in FIG. 5D, and icons 1 to 6, which are moved from folder 6 to a location outside of folder 6, may be displayed in some free area one at a time.

Otherwise, if an action that the user moves repeatedly left and right with touch to the folder maintained doesn't occur, it is determined that no icon movement event occurs in the portable terminal and in step 413 a function according to a touch action by the known method is carried out and then the algorithm according to the present invention is terminated. For example, if the user touches a folder and then releases the touch immediately, the function to open the folder for displaying the icons included in the folder is carried out in the portable terminal.

In the forgoing detailed description of the present invention, the icons included in the folder may be moved to an outside free area by sensing the touch of the user to move left and right, but a touch of the user that moves up and down or in a diagonal direction may be sensed to move the icons included to the folder in the outside area. That is, according to the present invention, icons included in a folder may be moved to an outside area regardless the direction of touch movement, if the touch of the user moves repeatedly traveling back and forth above a critical distance.

According to the present invention, there is an advantage in that the convenience of the user may be improved by sensing the touch of the user and moving all the application icons included in the folder to an outside area at one time, resulting in all the icons included in the folder moving with a simple action in a shorter time than an action according to the known method.

While the present invention has been particularly shown and described with reference to embodiments thereof, it will be understood by those skilled in the art that various changes in form and details may be made therein without departing from the spirit and scope of the present invention as defined by the appended claims.

What is claimed is:

1. A method for managing icons in a portable terminal, the method comprising:
   displaying a folder item including at least one icon;
   sensing a user touch action on the folder item; and
   moving the at least one icon included in the folder item to an area outside of the folder item according to the user touch action by detecting whether the user touch action includes repeatedly traveling back and forth on the folder item while maintaining the user touch action on the folder item.

2. The method of claim 1, wherein moving the at least one icon included in the folder item further comprises:
   moving, upon detecting that the user touch action includes repeatedly traveling back and forth on the folder item while maintaining the user touch action on the folder item, all of the icons included in the folder item to the area outside of the folder item.

3. The method of claim 1, further comprising:
   selecting the folder item according to the user touch action; and
   displaying the at least one icon included in the selected folder item,
   wherein the user touch action is applied to an area outside of an area in which the at least one icon is displayed.

4. The method of claim 1, wherein detecting whether the user touch action includes repeatedly traveling back and forth on the folder item while maintaining the user touch action on the folder item includes detecting whether the user touch action travels back and forth beyond a predetermined distance.

5. The method of claim 1, wherein the traveling back and forth on the folder item while maintaining the user touch action on the folder item includes at least one of left and right movement, up and down movement, and diagonal movement.

6. The method of claim 1, further comprising performing, upon sensing the user touch action, at least one of changing a size, shape or hue of the folder item, and displaying an animation effect.

7. The method of claim 1, wherein the area outside of the folder item corresponds to a parent of the folder item.

8. The method of claim 1, wherein moving the at least one icon includes displaying all of the icons included in the folder item in an area unoccupied by other icons.

9. The method of claim 1, further comprising deleting the folder item, after moving all of the icons included in the folder item to the area outside of the folder item.

10. The method of claim 1, further comprising:
    moving, upon detecting that the user touch action includes repeatedly traveling back and forth on the folder item while maintaining the user touch action on the folder item, a plurality of icons included in the folder item to the area outside of the folder item one at a time according to the number of repetitions.

11. An apparatus for managing icons in a portable terminal, the apparatus comprising:
- a display unit configured to display a folder item including at least one icon;
- a touch sensor configured to detect a user touch action on the folder item; and
- a control unit configured to move the at least one icon included in the folder item to an area outside of the folder item according to the user touch action when the user touch action includes repeatedly traveling back and forth on the folder item while maintaining the user touch action on the folder item.

12. The apparatus of claim 11, wherein the control unit is further configured to move all of the icons included in the folder item to the area outside of the folder item, upon detecting that the user touch action includes repeatedly traveling back and forth on the folder item while maintaining the user touch action on the folder item.

13. The apparatus of claim 12, wherein the control unit is further configured to control selection of the folder item according to the user touch action, and controls display of the at least one icon included in the folder item in the display unit, and
  wherein the user touch action is applied to an area outside of an area where the icons included in the folder item are displayed.

14. The apparatus of claim 11, wherein the control unit is further configured to detect whether the user touch action travels back and forth beyond a predetermined distance.

15. The apparatus of claim 11, wherein the traveling back and forth on the folder item while maintaining the user touch action on the folder item includes at least one among left and right movement, up and down movement, and diagonal movement.

16. The apparatus of claim 11, wherein the control unit is further configured to perform, upon sensing the user touch action, at least one of changing a size, shape, or hue of the folder item, and displaying an animation effect.

17. The apparatus of claim 11, wherein the area outside of the folder item corresponds to a parent of the folder item.

18. The apparatus of claim 11, wherein moving the at least one icon includes displaying all of the icons included in the folder item in an area previously unoccupied by other icons.

19. The apparatus of claim 11, wherein the control unit is further configured to delete the folder item, after moving all of the icons included in the folder item to the area outside of the folder item.

20. The apparatus of claim 11, wherein the control unit is further configured to move a plurality of icons included in the folder item to the area outside of the folder item one at a time according to the number of repetitions, upon detecting that the user touch action includes repeatedly traveling back and forth on the folder item while maintaining the user touch action on the folder item.

* * * * *